United States Patent
Bridges (10) Patent No.: US 9,755,394 B1
(45) Date of Patent: Sep. 5, 2017

(54) FIBER TEMPERATURE CONTROL ASSEMBLY

(71) Applicant: ADVA Optical Networking SE, Meiningen-Dreissigacker (DE)

(72) Inventor: Rodney Bridges, Lilburn, GA (US)

(73) Assignee: ADVA OPTICAL NETWORKING SE, Meiningen-Dreissigacker (DE)

( * ) Notice: Subject to any disclaimer, the term of this patent is extended or adjusted under 35 U.S.C. 154(b) by 0 days.

(21) Appl. No.: 15/136,387

(22) Filed: Apr. 22, 2016

(51) Int. Cl.
| | |
|---|---|
| H01S 3/067 | (2006.01) |
| H01S 3/16 | (2006.01) |
| H01S 3/094 | (2006.01) |
| H01S 3/04 | (2006.01) |

(52) U.S. Cl.
CPC ............ *H01S 3/04* (2013.01); *H01S 3/06704* (2013.01); *H01S 3/06754* (2013.01); *H01S 3/094003* (2013.01); *H01S 3/1608* (2013.01)

(58) Field of Classification Search
CPC ...... H01S 3/04; H01S 3/0405; H01S 3/06704; H01S 3/06754; H01S 3/094003
See application file for complete search history.

(56) References Cited

U.S. PATENT DOCUMENTS

| | | | |
|---|---|---|---|
| 6,147,795 A | 11/2000 | Derbyshire et al. | |
| 6,546,180 B1* | 4/2003 | Koyano | H01S 3/06704 385/123 |
| 7,308,182 B2 | 12/2007 | McCaig | |
| 2007/0280620 A1* | 12/2007 | Matsuda | G02B 6/423 385/137 |
| 2008/0317426 A1* | 12/2008 | Shukunami | G02B 6/4457 385/137 |
| 2010/0247055 A1* | 9/2010 | Arashitani | H01S 3/06704 385/137 |
| 2012/0301097 A1* | 11/2012 | Nakano | H01S 3/06704 385/134 |
| 2014/0010497 A1* | 1/2014 | Kelly | H01S 3/302 385/28 |

* cited by examiner

*Primary Examiner* — Eric Bolda
(74) *Attorney, Agent, or Firm* — Jenkins, Wilson, Taylor & Hunt, P.A.

(57) ABSTRACT

A fiber temperature control assembly comprising a spool holding element adapted to hold a fiber spool and a compression element adapted to press fiber windings of a doped optical fiber wound around the fiber spool against said spool holding element being in thermal contact with a heating and/or cooling element of said fiber temperature control assembly.

15 Claims, 7 Drawing Sheets

FIBER TEMPERATURE CONTROL ASSEMBLY

TECHNICAL FIELD

The invention relates to a fiber temperature control assembly and to a method for adjusting a temperature of a doped optical fiber wound around a fiber spool.

TECHNICAL BACKGROUND

Although the low loss of optical fiber allows signals to travel hundreds of kilometers or miles, long haul lines require regenerators or repeaters to amplify the signal periodically. In the beginning, repeaters basically did comprise a receiver followed by a transmitter. The incoming signal was converted from a light signal to an electrical signal by a receiver cleaned up to remove as much signal noise as possible and then retransmitted by another laser transmitter. However, these conventional repeaters add noise to the signal and consume much power. Other disadvantages of these conventional repeaters are their complexity and inflexibility.

Consequently the electronic repeaters have been widely replaced by optical amplifiers comprising doped optical fibers.

Figure 1:
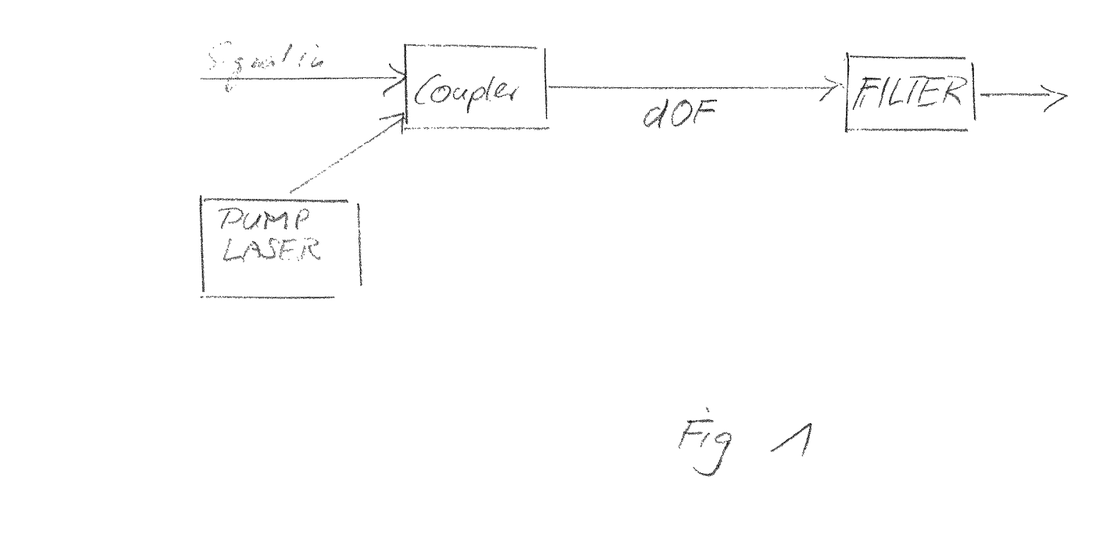
FIG. 1 shows schematically a conventional optical amplifier.

FIG. 1 shows schematically an optical amplifier. The optical amplifier comprises a doped optical fiber dOF between a coupler and a filter. A pump laser supplies energy to the amplifier while an incoming signal stimulates emission as a pulse passes through the doped optical fiber dOF. A stimulated emission is a rapid exponential growth of photons in the doped optical fiber. The doped optical fiber dOF then can be arranged in a fiber spool. In a conventional optical amplifier, a doped optical fiber dOF with a predetermined length can be wound around a fiber spool. In order to improve a gain flatness of the optical amplifier the temperature of the optical fiber can be increased by means of a coil heater. If the coil heater is powered up the produced heat can be transferred to the fiber spool and hence to the doped optical fibers of the optical amplifier. However, such a conventional arrangement has the disadvantage that it does not provide for a uniform heating of the individual optical fiber windings wound around the fiber spool. As a consequence, the doped optical fiber wound around the spool cannot be heated accurately and the gain flatness of the optical amplifier is diminished.

Accordingly, there is a need for a fiber temperature control assembly which provides a uniform heating of the doped optical fiber wound around a fiber spool to improve gain flatness of the optical amplifier.

SUMMARY OF THE INVENTION

The invention provides according to a first aspect a fiber temperature control assembly comprising
a spool holding element adapted to hold a fiber spool and
a compression element adapted to press fiber windings of a doped optical fiber wound around a fiber spool against said spool holding element being in thermal contact with a heating and/or cooling element of said fiber temperature control assembly.

In a possible embodiment of the fiber temperature control assembly according to the first aspect of the present invention, the compression element is a compression gasket consisting of a fire retardant low compression elastic material.

In a possible embodiment of the fiber temperature control assembly according to the first aspect of the present invention, the compression element is made of an electric isolating material.

In a further possible embodiment of the fiber temperature control assembly according to the first aspect of the present invention, the compression element is adhered to a printed circuit board.

In a still further possible embodiment of the fiber temperature control assembly according to the first aspect of the present invention, the holding element comprises an aluminum element.

In a still further possible embodiment of the fiber temperature control assembly according to the first aspect of the present invention, the spool holding element comprises a cavity for receiving the fiber spool.

In a further possible embodiment of the fiber temperature control assembly according to the first aspect of the present invention, the fiber temperature control assembly further comprises a fiber spool retainer element adapted to retain said fiber spool inserted in a cavity of said spool holding element.

In a further possible embodiment of the fiber temperature control assembly according to the first aspect of the present invention, said heating element comprises a heating coil adhered to said spool holding element.

In a further possible embodiment of the fiber temperature control assembly according to the first aspect of the present invention, the fiber spool retainer element is a thin flexible plate made of a fire retardant material.

In a still further possible embodiment of the fiber temperature control assembly according to the first aspect of the present invention, the doped optical fiber wound around said fiber spool is an erbium-doped optical fiber.

The invention further provides according to a second aspect an optical amplifier comprising a doped optical fiber wound around a fiber spool, said optical amplifier comprising
a fiber temperature control assembly for heating or cooling said doped optical fiber,
wherein said fiber temperature control assembly comprises:
a spool holding element adapted to hold said fiber spool and a compression element adapted to press fiber windings of the doped optical fiber wound around said fiber spool against said spool holding element being in thermal contact with a heating and/or cooling element of said fiber temperature control assembly.

In a possible embodiment of the optical amplifier according to the second aspect of the present invention, the optical amplifier comprises a control circuit adapted to control a temperature of said doped optical fiber wound around said fiber spool.

In a still further possible embodiment of the optical amplifier according to the second aspect of the present invention, the optical amplifier comprises at least one pump laser adapted to generate pump power supplied to the doped optical fiber wound around said fiber spool.

In a further possible embodiment of the optical amplifier according to the second aspect of the present invention, the pump power generated by the pump laser is supplied to the doped optical fiber wound around said fiber spool via fiber couplers of said optical amplifier.

The invention further provides according to a third aspect a method for adjusting a temperature of a doped optical fiber wound around a fiber spool comprising the steps of:

pressing fiber windings of the doped optical fiber by a flexible compression element against a spool holding element holding said fiber spool, and controlling the temperature of said spool holding element by means of a heating element and/or by means of a cooling element being in thermal contact with said spool holding element.

BRIEF DESCRIPTION OF FIGURES

In the following, possible embodiments of the different aspects of the present invention are described in more detail with reference to the enclosed figures.

DETAILED DESCRIPTION OF EMBODIMENTS

Figure 2:
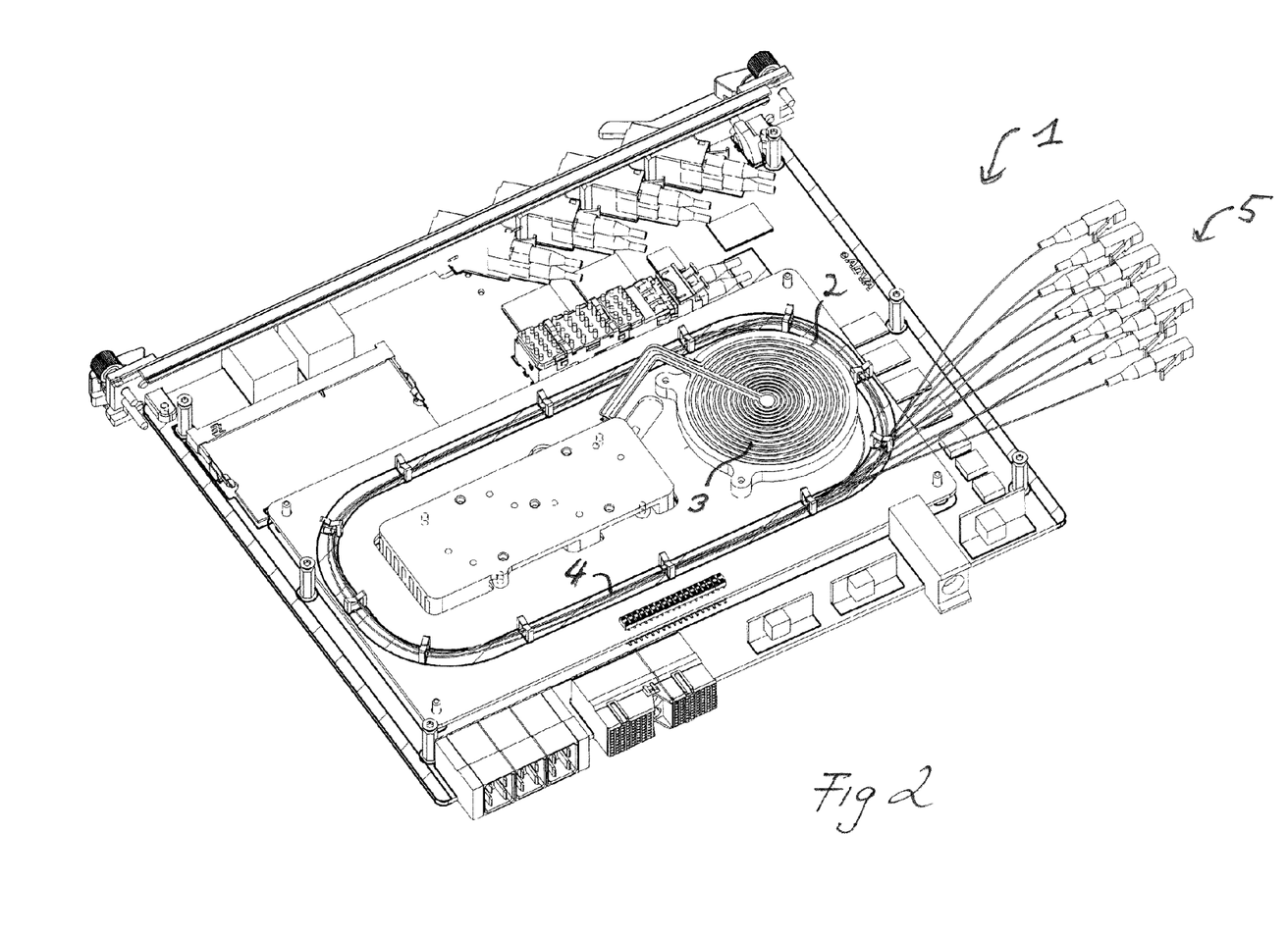
FIG. 2 shows a perspective view on an optical amplifier according to an aspect of the present invention comprising a fiber temperature control assembly according to the present invention.

FIG. 2 shows a perspective view on a possible exemplary embodiment of an optical amplifier 1 according to an aspect of the present invention.

The optical amplifier 1 comprises a fiber track area including a doped optical fiber dOF having a spool holding element covered by a heating and/or cooling element. In the illustrated exemplary embodiment of the optical amplifier 1 as shown in FIG. 2, a spool holding element 2 is covered by a heating element 3. The spool holding element 2 is in thermal contact with the heating element 3 of the fiber temperature control assembly of the optical amplifier 1. The spool holding element 2 is adapted to hold a fiber spool of the optical fiber track. A fiber track 4 defines an area comprising the fiber temperature control assembly having the spool holding element 2 covered by the heating element 3. The optical amplifier 1 comprises pluggable fiber pigtails 5 as shown in FIG. 2. The doped optical fiber dOF can be wound as illustrated in FIG. 2 in a circular fiber track 4 including a fiber spool held by the spool holding element 2 as shown in FIG. 2. The doped optical fiber dOF can comprise for instance in a possible implementation an erbium-doped optical fiber.

Figure 3:
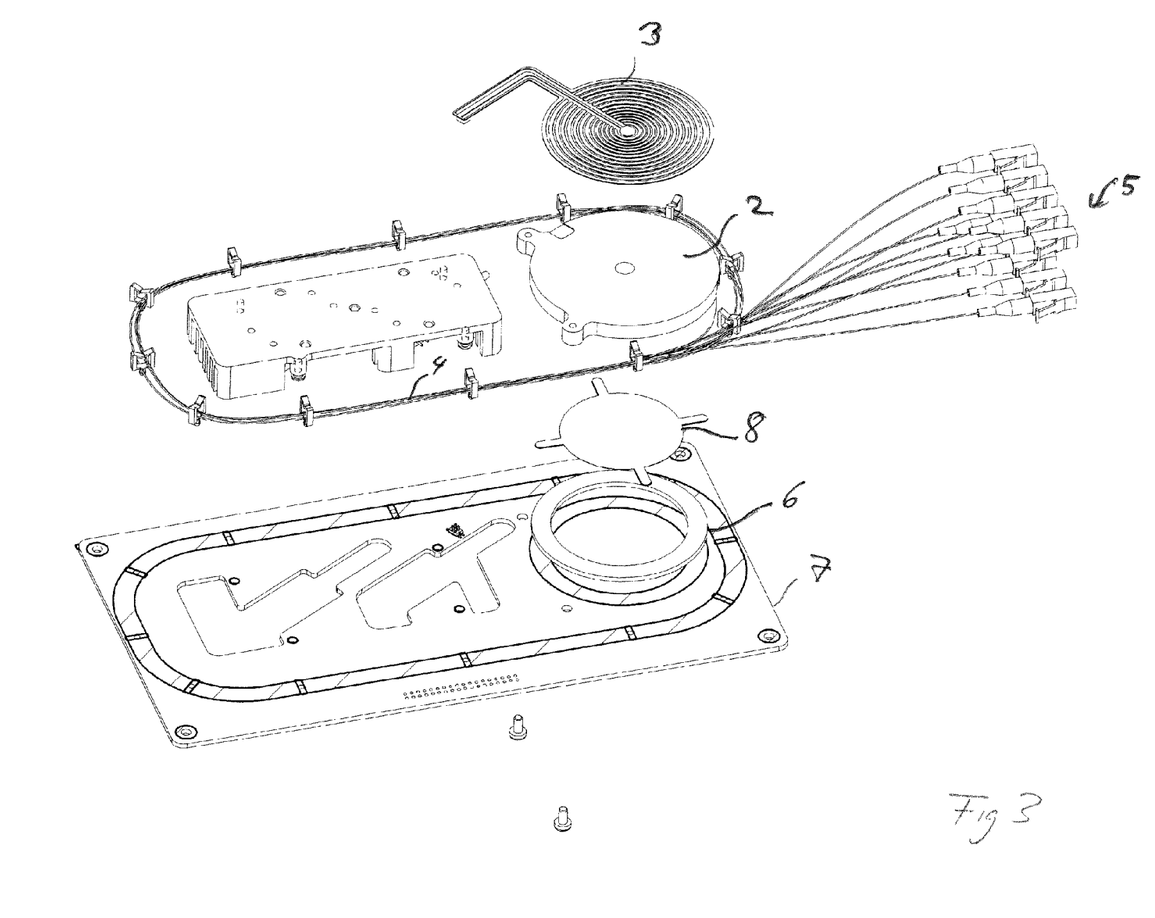
FIG. 3 shows a perspective explosive view from above on the fiber track area within an optical amplifier illustrated in FIG. 2 comprising a fiber temperature control assembly according to an embodiment of the present invention.

FIG. 3 shows an explosive perspective view on the area defined by the fiber track 4 of the optical amplifier 1 from above. The spool holding element 2 as shown in FIG. 3 is adapted to hold a fiber spool of an optical fiber such as an erbium-doped optical fiber. The fiber temperature control assembly comprising the spool holding element 2 further comprises a compression element 6 adapted to press fiber windings of the doped optical fiber dOF wound around in a fiber spool against the spool holding element 2 which is in thermal contact with the heating and/or cooling element 3 as shown in FIG. 2. The compression element 6 in a preferred embodiment is a compression gasket consisting of a fire retardant low compression elastic material. The compression element 6 can be mounted to a printed circuit board 7. In a possible embodiment, the compression element 6 is made of an electric isolating material. The fiber temperature control assembly comprises in a possible embodiment a fiber spool retainer element 8 which is adapted to retain the fiber spool inserted into a cavity of the spool holding element 2. In a possible embodiment, the fiber spool retainer element 8 can be formed by a flexible plate made of a fire retardant material such as Kapton material.

Figure 4:
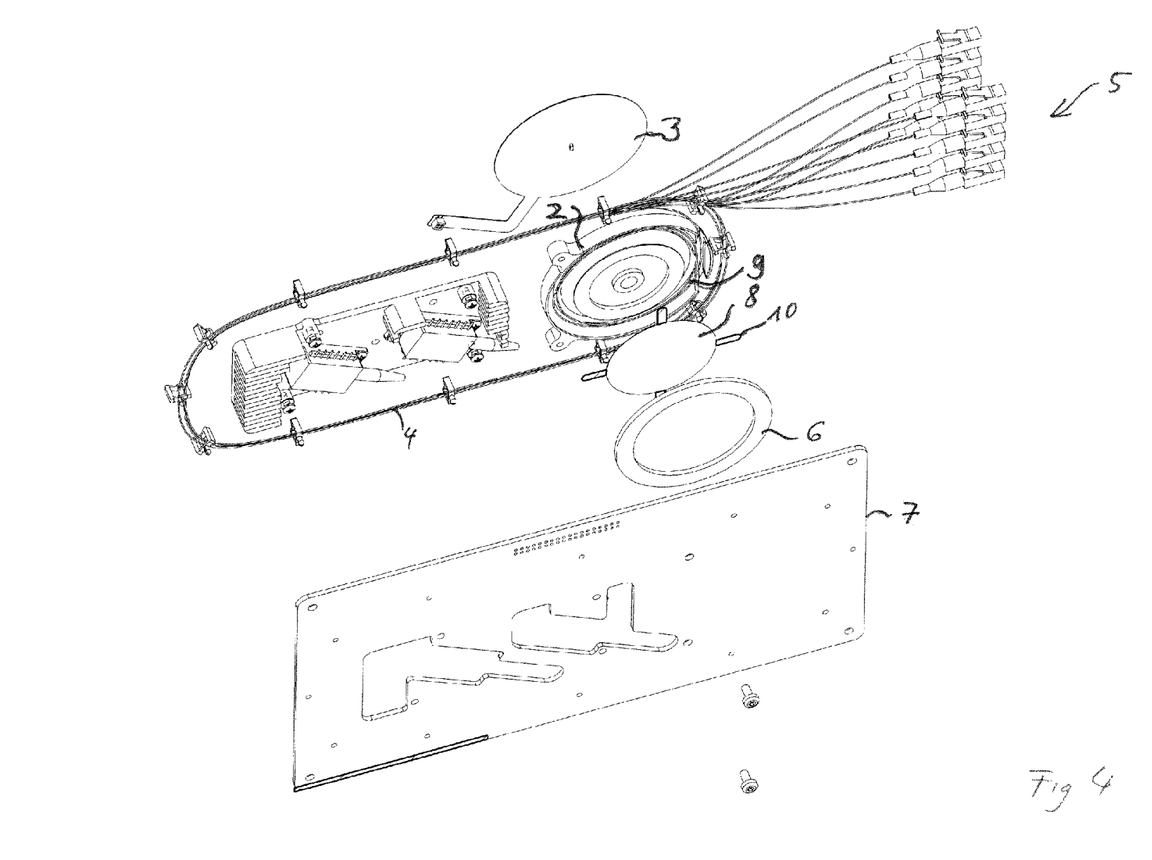
FIG. 4 shows a perspective explosive view from below on a fiber track portion of the optical amplifier illustrated in FIG. 2 comprising a fiber temperature control assembly according to a possible embodiment of the present invention.

FIG. 4 shows a perspective explosive view from below on the fiber temperature control assembly within the fiber track area 4. As can be seen in FIG. 4, the spool holding element 2 is adapted to hold a loose fiber spool 9 comprising a plurality of fiber windings of the fiber track. The fiber spool retainer element 8 retains the loose fiber spool inserted in a cavity of the spool holding element 2. The heating/cooling element 3 can be attached to the surface of the spool holding element 2. In a possible embodiment, the spool holding element 2 can be formed by a metal, in particular aluminum. The spool holding element 2 can be formed by a cast element comprising a cavity for receiving the loose fiber spool 9 retained by the fiber spool retainer element 8. The doped optical fiber dOF wound within the loose fiber spool 9 received by the cavity of the spool holding element 2 can be for instance an erbium-doped optical fiber. Several protrusions 10 of the fiber spool retainer element 8 retain the loose fiber spool 9 comprising a plurality of windings within the cavity of the spool holding element 2.

Figure 5:
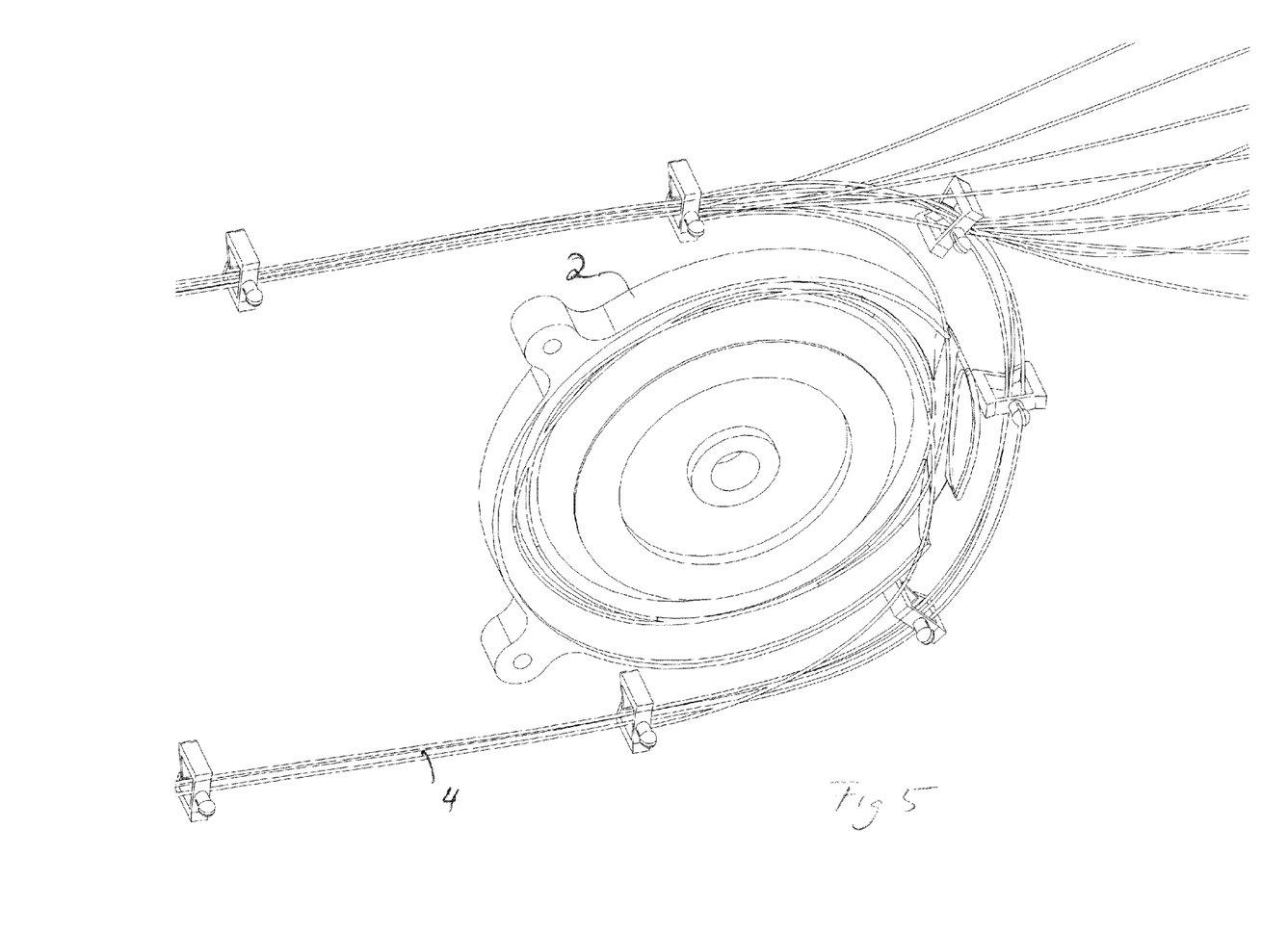
FIG. 5 shows a detailed view on a spool holding element of a fiber temperature control assembly according to a possible embodiment of the present invention.
Figure 6:
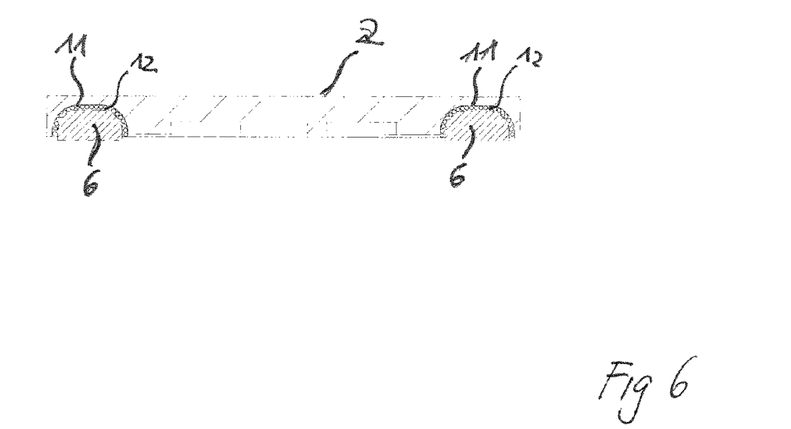
FIG. 6 shows a sectional view on a spool holding element of the fiber temperature control assembly according to a possible embodiment of the present invention.
Figure 7:
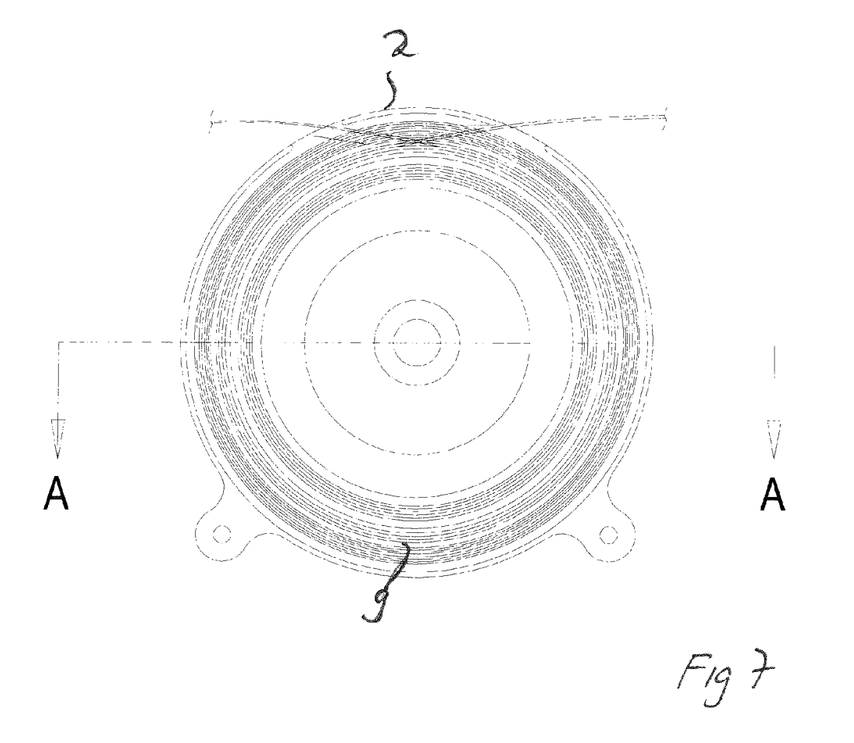
FIG. 7 shows a front view on a spool holding element as used in a fiber temperature control assembly according to a possible embodiment.

FIG. 5 shows an enlarged view on the spool holding element 2 from below. FIG. 6 shows a sectional view along line A-A through a possible embodiment of the spool holding element 2 of the fiber temperature control assembly according to a possible embodiment of the present invention as shown in FIG. 7. FIG. 7 shows a front view on the spool holding element 2 from below. As can be seen in FIG. 7, the loose fiber spool 9 is inserted into a cavity 11 of the spool holding element 2. The fiber spool 9 can be retained by the protrusions 10 of the fiber spool retainer element 8. The fiber spool 9 comprises a plurality of circular windings 12 wherein the compression element 6 pushes individual fiber strands 12 or fiber windings against the spool holding element 2 as illustrated in the sectional view of FIG. 6. As can be seen in FIG. 6, there is a single layer of fiber windings or fiber strands 12 pressed by the compression element 6 against the inner cavity 11 of the spool holding element 2. The compression element 6 is made of an elastic material. The compression element 6 can be a compression gasket consisting of a fire retardant low compression elastic material. As can be seen in FIG. 6, the fiber windings are in direct thermal contact with the spool holding element 2 which allows a very accurate temperature control through the heating and/or cooling element 3 attached to the surface of the spool holding element 2 as shown in FIG. 1. The element 3 can be for instance a Mila heater control element that is attached to the spool holding element 2. The spool holding element 2 can be formed by an aluminum die cast heat sink block. By pushing the single layer of fiber windings 12 against the spool holding element 2, a uniform heating of the whole fiber loop can be achieved. The spool holding element 2 can act as a heat sink or heat source. Further, the arrangement allows for using optical doped fibers of various diameters due to various compression depths inherent to the used compression gasket 6. In a possible embodiment, the optical amplifier 1 can comprise a control circuit adapted to control a temperature T of the doped optical fiber dOF wound around the fiber spool 9. The optical amplifier 1 comprises at least one pump laser adapted to generate pump power supplied to the doped optical fiber within the fiber track 4 wound around the fiber spool hold by said spool holding element 2 of the fiber temperature control assembly. In a possible embodiment, the pump power generated by the pump laser is supplied to the doped optical fiber wound within the fiber spool 9 via fiber couplers of the optical amplifier.

Figure 8:
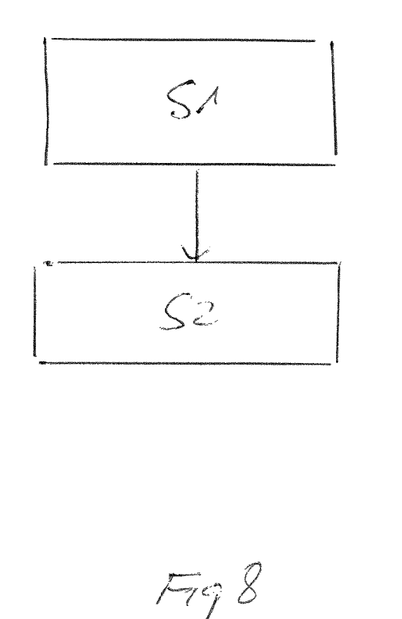
FIG. 8 illustrates a flow chart of an exemplary embodiment of a method for adjusting a temperature of a doped optical fiber according to a further aspect of the present invention.

FIG. 8 shows a flowchart of a possible exemplary embodiment of a method for adjusting a temperature T of a doped optical fiber wound within a fiber spool.

In a first step S1, fiber windings of the doped optical fiber are pressed by means of a flexible compression element such as the compression element 6 against a spool holding element such as the spool holding element 2 holding the fiber spool 9.

In a further step S2, the temperature of the spool holding element 2 is controlled by means of a heating element and/or a cooling element 3 being in thermal contact with the spool holding element 2.

The method and assembly according to the present invention allows for individual optical doped fibers to be heated very accurately without the use of bonding or layer substrates. It further allows to employ optical doped fibers oDF with different diameters using the same heater device due to the flexible characteristics of the compression element 6. The isolation characteristics of the compression gasket 6 focus heating on the optical doped fibers dOF and not on the printed circuit board 7. The fiber temperature control assembly according to the present invention further allows ease of assembly resulting in a fast mounting of the optical amplifier 1. By achieving a very uniform heating of the different fiber windings 12 of the fiber spool 9 a very flat gain spectrum of the optical amplifier 1 can be achieved. In a possible embodiment, the pressure force pressing the fiber windings 12 against the spool holding element 2 can be adjusted, for instance by means of a mechanical screw. In a further possible embodiment, the compression element 6 can be exchanged or replaced to define a predetermined pressure force F pressing the fiber windings 12 against the inner cavity 11 of the spool holding element 2. In a possible embodiment, compression elements 6 or compression gaskets with different thickness can be used to define the pressure force F. In a still further possible embodiment, the compression element gasket 6 can be replaced using gaskets with different elastic materials to define the pressure force F pressing the fiber windings 12 against the inner cavity 11 of the spool holding element 2. Use of compression elements 6 with a high thickness made of a less elastic material increases the pressure force F applied to the fiber windings and consequently the heat transferred from the heating element 3 via the spool holding element 2 to the fiber windings 12. The adjustment of the temperature T of the doped optical fiber windings 12 can be performed manually and/or automatically by controlling the pressure force F and/or the heat generated by the heating element 3.

The optical amplifier 1 according to an aspect of the present invention can be adapted to amplify wavelength division multiplexed, WDM, signals in the optical domain without conversion into the electrical baseband. The optical amplifier 1 is transparent with regard to protocols carried in individual WDM channels.

The invention claimed is:

1. A fiber temperature control assembly, comprising:
   a spool holding element adapted to hold a fiber spool, and
   a compression element adapted to press fiber windings of a doped optical fiber wound around the fiber spool against said spool holding element, said spool holding element being in thermal contact with either one of a heating and a cooling element of said fiber temperature control assembly.

2. The fiber temperature control assembly according to claim 1, wherein said compression element is a compression gasket consisting of fire resistant low compression elastic material.

3. The fiber temperature control assembly according to claim 1, wherein said compression element is made of an electric isolating material.

4. The fiber temperature control assembly according to claim 1, wherein said compression element is adhered to a printed circuit board.

5. The fiber temperature control assembly according to claim 1, wherein said spool holding element comprising an aluminum element.

6. The fiber temperature control assembly according to claim 1, wherein said spool holding element comprising a cavity for receiving said fiber spool.

7. The fiber temperature control assembly according to claim 1, further comprising a fiber spool retainer element adapted to retain said fiber spool inserted in a cavity of said spool holding element.

8. The fiber temperature control assembly according to claim 1, wherein said heating element comprising a heating coil adhered to said spool holding element.

9. The fiber temperature control assembly according to claim 7, wherein the fiber spool retainer element is a flexible plate made of fire resistant material.

10. The fiber temperature control assembly according to claim 1, wherein the doped optical fiber wound around said fiber spool is an erbium-doped optical fiber.

11. An optical amplifier, comprising:
    a doped optical fiber wound around a fiber spool, and
    a fiber temperature control assembly for heating or cooling said doped optical fiber, wherein said fiber temperature control assembly comprising:
    a spool holding element adapted to hold said fiber spool, and
    a compression element adapted to press fiber windings of the doped optical fiber wound around said fiber spool against said spool holding element, said spool holding element being in thermal contact with either one of a heating and a cooling element of said fiber temperature control assembly.

12. The optical amplifier according to claim 11, further comprising:
    a control circuit adapted to control a temperature of said doped optical fiber wound around said fiber spool.

13. The optical amplifier according to claim 11, further comprising:

at least one pump laser adapted to generate pump power supplied to the doped optical fiber wound around said fiber spool.

14. The optical amplifier according to claim 13, wherein pump power generated by the pump laser is supplied to the doped optical fiber wound around said fiber spool via fiber couplers of said optical amplifier.

15. A method for adjusting a temperature of a doped optical fiber wound around a fiber spool, comprising the steps of:
  pressing fiber windings of said doped optical fiber by a compression element against a spool holding element holding said fiber spool, and
  controlling the temperature of said spool holding element by means of either one of a heating element and/or a cooling element being in thermal contact with said spool holding element.

* * * * *